Oct. 12, 1943.    H. H. HUMMEL    2,331,397
TRELLIS SUPPORT
Filed April 7, 1941

Inventor
Herbert H. Hummel.

Attorney.

Patented Oct. 12, 1943

2,331,397

UNITED STATES PATENT OFFICE 2,331,397

TRELLIS SUPPORT

Herbert H. Hummel, Glendale, Calif.

Application April 7, 1941, Serial No. 387,177

2 Claims. (Cl. 47—47)

My invention relates to trellis devices and more particularly it has to do with novel means for supporting trellis members in flower pots and the like.

Devices embodying my invention are particularly adapted for providing trellis means to support and exhibit growing flower plants in pots and the like, and especially plants which, due to growth, require frequent changes in the position and height of trellis as the growth of the plant progresses. Heretofore it has been the practice to support such plants by forcing a supporting stake into the earth around the roots of the plant with the result that as the plant growth requires changing the trellis, the stake must be removed and a new one forced into the earth around the roots of the plant. This not only injures the roots and disturbs the soil therearound, with resultant injury to the plant, but such supports are, for the most part, unsteady, unsightly and, being usually made of wood, rot very rapidly.

It is therefore an aim of my invention to provide a trellis having a support which may be permanently embedded in the soil around the roots of the plant, the device including a trellis support provided with socket means into which trellis members may be inserted and secured and changed as frequently as may be desired without in any way disturbing the soil around the plant.

Another object is to provide a trellis support which is so designed and constructed as to be firmly held in position by the soil around the plant.

Another object is the provision of an efficient and effective trellis device which may be economically manufactured and capable of long life.

Still further objects and accomplishments of my invention will become obvious from the following detailed description of one presently preferred embodiment thereof, for which purpose I shall refer to the accompanying drawing, in which.

Figure 1:
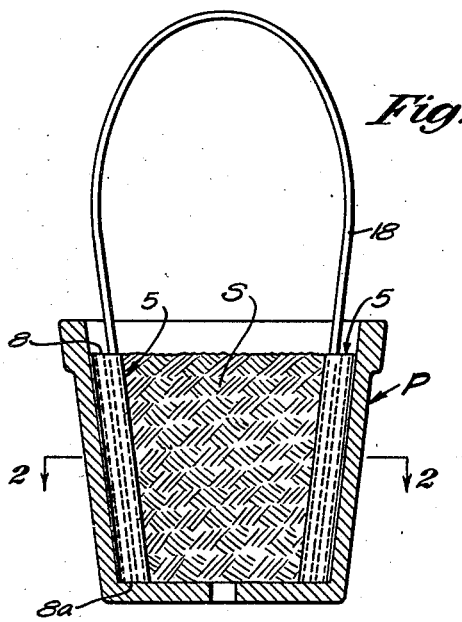
Fig. 1 is a vertical section of a flower pot having mounted therein my novel trellis device.
Figure 2:
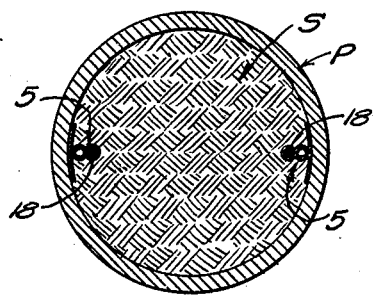
Fig. 2 is a plan section on line 2—2 of Fig. 1.
Figure 4:
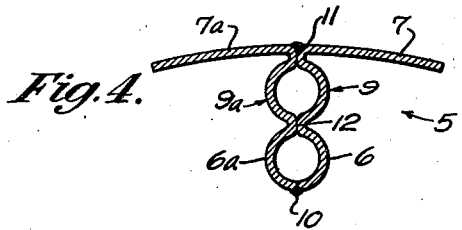
Fig. 4 is a section on line 4—4 of Fig. 3.
Figure 3:
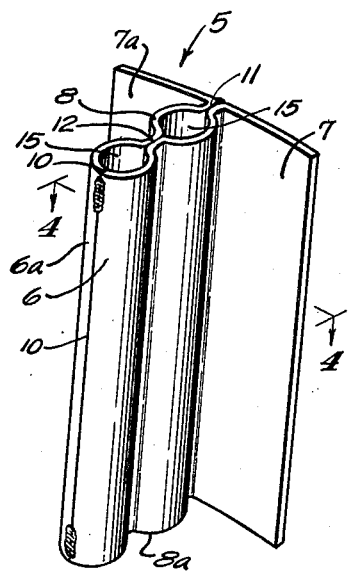
Fig. 3 is an enlarged perspective showing the trellis support.

Referring now to the drawing, I show at P a conventional flower pot having circular side walls and being filled with soil S.

At opposite sides in the pot I embed in the soil a pair of my novel trellis supporting members, generally designated by the numeral 5. Each of these supports 5 is comprised of companion members 6, 6a having base portions 7, 7a which, in cross-section, are preferably curved to conform to the curvature of the side wall of the flower pot P. The top and bottom ends 8, 8a of members 5 are preferably beveled to permit the base portions 7, 7a to rest against the side wall of a plant receptacle or pot P having a tapered side wall, as shown in Fig. 1.

Preferably formed integral with said base portions I provide corrugated portions 9, 9a, said respective portions 9, 9a being oppositely disposed and welded or otherwise suitably secured together along their contacting front edges 10 and base edges 11. To further safeguard against their spreading apart, portions 9, 9a may be also spot welded along their intermediate contacting portions 12. When thus assembled and secured together members 6, 6a provide a plurality of sockets 15 to receive and detachably hold one end of trellis wires or rods as shown at 18. As shown in Fig. 1, trellis wires 18 may be arched over the plant, with their respective ends inserted in the sockets 15 of the respective supports 5. The trellis wires are thus firmly held in position and may be removed and re-inserted at will without disturbing the roots of the plant. The base portions 7, 7a and corrugated portions 9, 9a being disposed at an angle to each other, serve, when embedded in the soil, to prevent the supports from tilting in either direction. It is usually desirable to provide a greater number of sockets 15 than may be initially required, so that additional trellis wires may be added as the plant grows.

While I have shown and described a pair of trellis supports 5 in the flower pot, it will of course be understood that one or even more than two may be used, as the type of trellis may require.

Also, my trellis supports may take other specific forms. For instance, in Fig. 5, I show a variational form in which the trellis support is formed from a blank of metal—preferably galvanized metal. The blank is provided with a plurality of alined slits 25 disposed in parallel rows—the number of rows depending upon the number of trellis wires or rods desired to be used—and the blank is then stamped so that the metal at the respective sides of the slits is embossed in opposite directions to provide sockets 27 to receive the trellis wires or rods. The base portion 28 is disposed at an angle to the body portion 29 and is preferably, though not necessarily, curved in cross-section to conform to the shape of the side wall of the flower pot or the like in which it is mounted.

Figure 6:
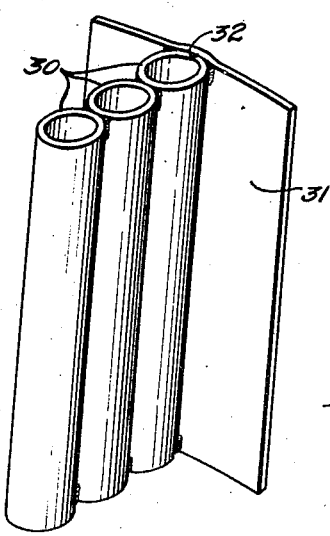
Fig. 6 is a perspective showing a further variational form of support.

In Fig. 6, I show still another variational form in which a plurality of tubular members 30 are welded or otherwise suitably secured together in side by side relationship, the innermost tube 30 being welded or otherwise suitably secured to a base plate 31, the plate being provided with an embossed channel 32 to receive the innermost tube.

Figure 5:
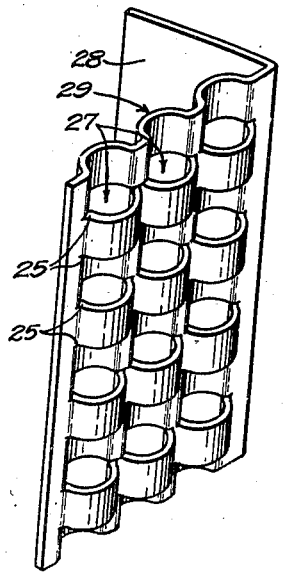
Fig. 5 is a perspective of a variational form of trellis support.

The device of Figs. 5 and 6 are adapted to be mounted in the soil of the flower pot in the same manner as the supports of Figs. 1 to 4, inclusive.

While I have resorted to considerable detail for the purpose of making my invention understood, I wish it understood that within the broader scope of my invention, as defined by the appended claims, various modifications and adaptations may be made without departing from the spirit of the invention.

I claim:

1. A trellis support adapted to be embedded in soil, including a body comprised of corrugated companion plates secured together with their corrugations in opposed relationship to form trellis receiving sockets.

2. A trellis support adapted to be embedded in soil, including a body comprised of corrugated companion plates secured together with their corrugations in opposed relationship to form trellis receiving sockets, and a base portion carried by and disposed at an angle to the body portion.

HERBERT H. HUMMEL.